(12) United States Patent
Nakagoshi (10) Patent No.: US 12,200,178 B2
(45) Date of Patent: Jan. 14, 2025

(54) INFORMATION PROCESSING SYSTEM, IMAGE FORMING APPARATUS, AND MANAGEMENT SERVER

(71) Applicant: KYOCERA DOCUMENT SOLUTIONS INC., Osaka (JP)

(72) Inventor: Yusuke Nakagoshi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/242,580

(22) Filed: Sep. 6, 2023

(65) Prior Publication Data
US 2024/0080402 A1    Mar. 7, 2024

(30) Foreign Application Priority Data

Sep. 7, 2022 (JP) ................................. 2022-142429
Sep. 7, 2022 (JP) ................................. 2022-142430

(51) Int. Cl.
*H04N 1/00* (2006.01)
*G06F 3/12* (2006.01)
*G06K 15/02* (2006.01)
*H04N 1/34* (2006.01)

(52) U.S. Cl.
CPC ......... *H04N 1/346* (2013.01); *H04N 1/00344* (2013.01)

(58) Field of Classification Search
None
See application file for complete search history.

(56) References Cited

U.S. PATENT DOCUMENTS

| | | | | |
|---|---|---|---|---|
| 2013/0235418 A1* | 9/2013 | Tanaka | ................... | H04L 63/08 358/1.15 |
| 2014/0007199 A1* | 1/2014 | Ishino | ................. | H04L 63/0884 726/4 |
| 2014/0337928 A1* | 11/2014 | Hirakata | ................. | H04L 63/08 726/4 |
| 2014/0365655 A1* | 12/2014 | Takahashi | ............... | H04L 67/10 709/225 |
| 2015/0009527 A1* | 1/2015 | Mochizuki | ......... | G06K 15/1806 358/1.15 |
| 2015/0015908 A1 | 1/2015 | Tanaka | | |

(Continued)

FOREIGN PATENT DOCUMENTS

| | | |
|---|---|---|
| JP | 2013186674 A | 9/2013 |
| JP | 2015018404 A | 1/2015 |

*Primary Examiner* — Beniyam Menberu
(74) *Attorney, Agent, or Firm* — Li & Cai Intellectual Property (USA) Office (57) ABSTRACT

A job processing unit of an image forming apparatus notifies a management server of a first file selected from a file list by a user, a file supply unit of the management server acquires the first file from first cloud storage and transmits the acquired first file to the image forming apparatus, the job processing unit of the image forming apparatus executes a job using the first file and transmits a job log including a job counter value and identification information of the first cloud storage to the management server, and a job log aggregation unit of the management server is configured to aggregate a job counter value for identification information of each piece of cloud storage and counts up the job counter value included in the job log.

13 Claims, 9 Drawing Sheets

(56) References Cited

U.S. PATENT DOCUMENTS

| | | | |
|---|---|---|---|
| 2015/0381754 A1* | 12/2015 | Zhao | H04L 67/06 |
| | | | 709/219 |
| 2016/0004491 A1* | 1/2016 | Amano | G06F 3/1222 |
| | | | 358/1.14 |
| 2016/0352527 A1* | 12/2016 | Satoh | H04L 9/3268 |
| 2017/0099178 A1* | 4/2017 | Satoh | H04L 41/0686 |
| 2017/0257493 A1* | 9/2017 | Kawano | G06F 3/1287 |
| 2017/0262443 A1* | 9/2017 | Cho | G06F 16/192 |
| 2022/0291886 A1* | 9/2022 | Siddarth | G06F 3/1204 |

* cited by examiner

INFORMATION PROCESSING SYSTEM, IMAGE FORMING APPARATUS, AND MANAGEMENT SERVER

CROSS-REFERENCE TO RELATED PATENT APPLICATION

This application claims the benefit of Japanese Priority Patent Application JP 2022-142429 filed Sep. 7, 2022 and Japanese Priority Patent Application JP2022-142430 filed Sep. 7, 2022, the entire contents of which are incorporated herein by reference.

FIELD OF THE DISCLOSURE

The present disclosure relates to an information processing system including a management server that supplies a file recorded on cloud storage to an image forming apparatus and an image forming apparatus that executes a job using this file, and the image forming apparatus.

BACKGROUND OF THE DISCLOSURE

It is known that when executing a print job in an image forming apparatus such as a multifunction peripheral (MFP), a file transmitted from a personal computer (PC) is printed through a printer driver as well as a file managed on cloud storage that the MFP has an account is referred to on the image forming apparatus, selected, and printed.

SUMMARY OF THE DISCLOSURE

Executing a print job of a file retrieved from cloud storage is becoming more common. Further, a system that aggregates print results is also commonly used. There is a possibility that a unique problem occurs when printing of files recorded on a plurality of pieces of cloud storage and the system that aggregates print results are combined. For example, there is a problem that the aggregation cannot be simply performed with a user ID as a unit of aggregation due to the mismatch of a user account for cloud storage and a user ID managed in a company (Patent Literature 1). As a result, there is a possibility that the number of executions of the print job cannot be individually counted in accordance with the needs, e.g., for each piece of cloud storage.

It is desirable to individually count the number of executions of a job in accordance with the needs, e.g., for each piece of cloud storage.

Solution to Problem

An information processing system according to an embodiment of the present disclosure includes:
an image forming apparatus; and
a management server that is communicably connected to the image forming apparatus via a network,
the image forming apparatus including a login unit, a file list requesting unit, and a job processing unit,
the management server including a storage list supply unit, a file list supply unit, a file supply unit, and a job log aggregation unit,
the login unit of the image forming apparatus transmitting information relating to a user who logs in to the management server to the management server,
the storage list supply unit of the management server transmitting a cloud storage list to the image forming apparatus, the cloud storage list indicating a plurality of pieces of cloud storage that the user can use, the plurality of pieces of cloud storage being communicably connected to the management server via the network,
the file list requesting unit of the image forming apparatus notifying the management server of first cloud storage selected from the cloud storage list by the user,
the file list supply unit of the management server transmitting a file list to the image forming apparatus, the file list indicating one or more files that the user can use, the one or more files being recorded on the first cloud storage,
the job processing unit of the image forming apparatus notifying the management server of a first file selected from the file list by the user,
the file supply unit of the management server acquiring the first file from the first cloud storage and transmitting the acquired first file to the image forming apparatus,
the job processing unit of the image forming apparatus executing a job using the first file and transmitting a job log including a job counter value and identification information of the first cloud storage to the management server, and
the job log aggregation unit of the management server being configured to aggregate a job counter value for identification information of each piece of cloud storage and counting up the job counter value included in the job log.

According to this embodiment, the job log aggregation unit of the management server is capable of aggregating a job counter value (i.e., the job execution amount such as print volume) for identification information of each piece of cloud storage. As a result, a user can generate a more detailed aggregation report.

An image forming apparatus that is communicably connected to a management server via a network according to an embodiment of the present disclosure includes:
a login unit that transmits information relating to a user who logs in to the management server to the management server;
a file list requesting unit that receives a cloud storage list from the management server, the cloud storage list indicating a plurality of pieces of cloud storage that the user can use, the plurality of pieces of cloud storage being communicably connected to the management server via the network, and notifies the management server of first cloud storage selected from the cloud storage list by the user; and
a job processing unit that
receives a file list from the management server, the file list indicating one or more files that the user can use, the one or more files being recorded on the first cloud storage, and notifies the management server of a first file selected from the file list by the user, and
acquires, from the management server, the first file acquired by the management server from the first cloud storage, transmits the acquired first file to the image forming apparatus, executes a job using the first file, and transmits a job log to the management server, the job log including a job counter value and identification information of the first cloud storage.

A management server that is communicably connected to an image forming apparatus via a network according to an embodiment of the present disclosure includes:
a storage list supply unit that receives information relating to a user who logs in to the management server from the image forming apparatus and transmits a cloud storage list to the image forming apparatus, the cloud storage list indicating a plurality of pieces of cloud storage that the use can use, the plurality of pieces of cloud storage being communicably connected to the management server via the network;

a file list supply unit that receives, from the image forming apparatus, a notification of first cloud storage selected from the cloud storage list by the user and transmits a file list to the image forming apparatus, the file list indicating one or more files that the user can use, the one or more files being recorded on the first cloud storage;

a file supply unit that receives, from the image forming apparatus, a notification of a first file selected from the file list by the user, acquires the first file from the first cloud storage, and transmits the acquired first file to the image forming apparatus; and a job log aggregation unit that receives a job log from the image forming apparatus, the job log including a job counter value and identification information of the first cloud storage when executing a job using the first file, is configured to aggregate a job counter value for identification information of each piece of cloud storage, and counts up the job counter value of the identification information included in the job log.

An information processing system according to an embodiment of the present disclosure includes:

an image forming apparatus; and a management server that is communicably connected to the image forming apparatus via a network, the image forming apparatus including a login unit, a file list requesting unit, and a job processing unit, the management server including a storage list supply unit, a file list supply unit, a file supply unit, and a job log aggregation unit, the login unit of the image forming apparatus transmitting information relating to a user who logs in to the management server to the management server, the storage list supply unit of the management server transmitting a cloud storage list to the image forming apparatus, the cloud storage list indicating a plurality of pieces of cloud storage that the user can use, the plurality of pieces of cloud storage being communicably connected to the management server via the network, the file list requesting unit of the image forming apparatus notifying the management server of first cloud storage selected from the cloud storage list by the user, the file list supply unit of the management server transmitting a file list to the image forming apparatus, the file list indicating one or more files that the user can use, the one or more files being recorded on the first cloud storage, the job processing unit of the image forming apparatus notifying the management server of a first file selected from the file list by the user, the file supply unit of the management server acquiring the first file from the first cloud storage and transmitting the acquired first file to the image forming apparatus, the job processing unit of the image forming apparatus determining, as a destination of a job log, a first destination assigned to the first cloud storage from a plurality of destinations set in the management server, executing a job using the first file, and transmitting a job log including a job counter value to the first destination of the management server, the job log aggregation unit of the management server being configured to aggregate a job counter value for each destination and counting up the job counter value of the job log transmitted to the first destination.

According to this embodiment, the job log aggregation unit of the management server is capable of aggregating a job counter value (i.e., the job execution amount such as print volume) for each destination assigned to each piece of clous storage. As a result, a user can generate a more detailed aggregation report.

According to the present disclosure, it is possible to individually count the number of executions of a job in accordance with the needs, e.g., for each piece of cloud storage.

Note that the effects described herein are not necessarily limitative, and any affect described in the present disclosure may be exhibited.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

An embodiment of the present disclosure will be described below with reference to the drawings.

1. Information Processing System

Figure 1:
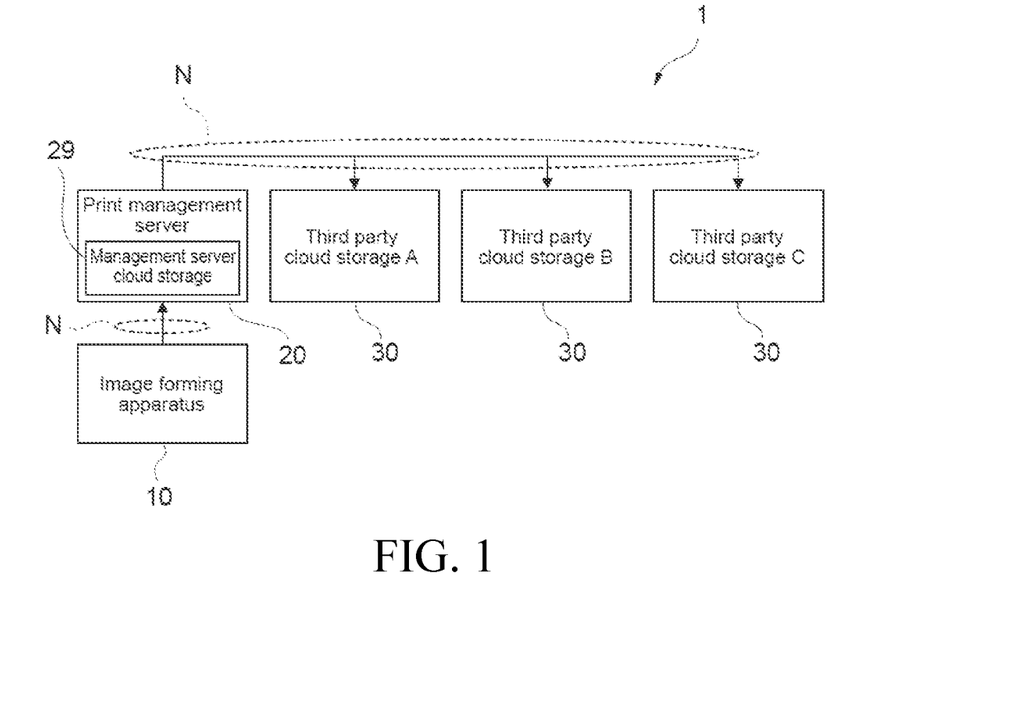
FIG. 1 shows an information processing system according to an embodiment of the present disclosure.

FIG. 1 shows an information processing system according to an embodiment of the present disclosure.

An information processing system 1 includes an image forming apparatus 10, and a print management server 20 communicably connected to each other via a network N such as the Internet.

The image forming apparatus 10 is, for example, a multifunction peripheral (MFP) and is placed in an office or the like. The image forming apparatus 10 typically includes a plurality of image forming apparatuses, but will be described as one image forming apparatus in this embodiment.

The print management server 20 manages a job of the image forming apparatus 10 and a user of the image forming apparatus 10. The print management server 20 is a print management server and has a function as cloud storage. In other words, the print management server 20 also functions as a management server cloud storage 29 capable of recording a file.

A user of the image forming apparatus 10 managed by the print management server 20 can register a link of a third party cloud storage 30 that the user himself/herself has an account in the print management server 20 by using the image forming apparatus 10. The print management server 20 is capable of accessing the third party cloud storage 30 via the network N.

Figure 2:
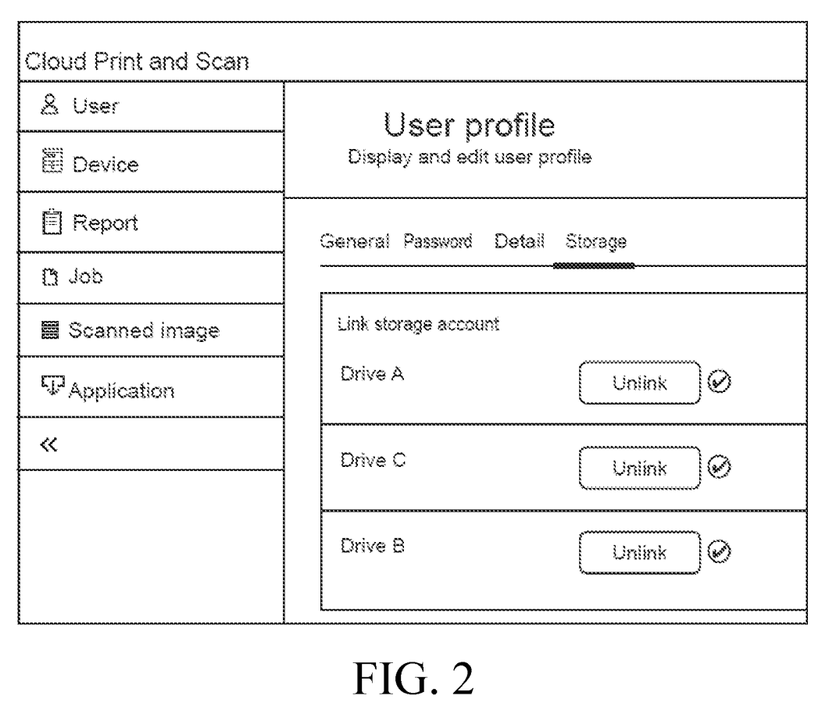
FIG. 2 shows an example of a GUI for registering third party cloud storage.

FIG. 2 shows an example of a GUI for registering third party cloud storage.

FIG. 2 shows an example in which a user who has logged in to the print management server 20 via the image forming apparatus 10 registers the links of three types of third party cloud storage 30 in the print management server 20 in association with the user via a GUI.

The management server cloud storage 29 is provided by a supplier of the print management server 20. Meanwhile, one piece or a plurality of pieces of third party cloud storage 30 is provided by a plurality of different third party suppliers different from the suppliers of the image forming apparatus 10 and the print management server 20. Each piece of third party cloud storage 30 records data that can be output to the image forming apparatus 10.

The user of the image forming apparatus 10 logs in to the print management server 20 via the touch panel of the image forming apparatus 10 and is capable of executing a print job or the like of a file downloaded from the third party cloud storage 30 or the management server cloud storage 29 via the print management server 20.

The user of the image forming apparatus 10 typically pays the usage fee for the third party cloud storage 30 to the supplier of the third party cloud storage 30. Meanwhile, the print management server 20 is typically provided by the supplier of the image forming apparatus 10. Typically, the management server cloud storage 29 is provided to the user as part of service of the print management server 20. For this reason, the user typically does not pay the usage fee for only the management server cloud storage 29 to the supplier of the print management server 20.

2. Hardware Configuration of Image Forming Apparatus

Figure 3:
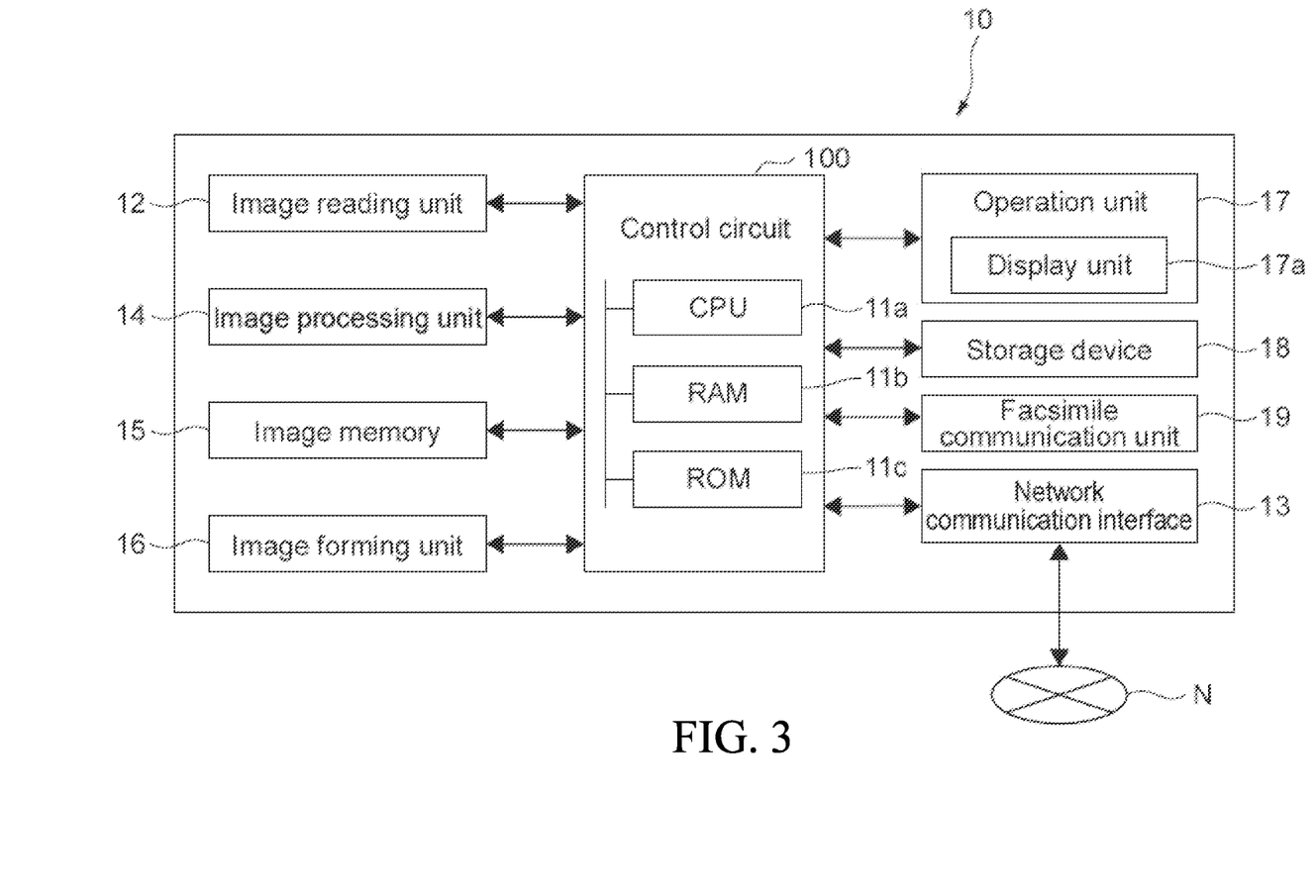
FIG. 3 shows a hardware configuration of an image forming apparatus.

FIG. 3 shows a hardware configuration of an image forming apparatus.

The image forming apparatus 10 includes a control circuit 100. The control circuit 100 includes a central processing unit (CPU) 11a that is a processor, a random access memory (RAM) 11b, a read only memory (ROM) 11c that is a memory, a dedicated hardware circuit, and the like, and is responsible for operation control of the entire image forming apparatus 10. The CPU 11a loads an information processing program stored in the ROM 11c into the RAM 11b and executes the program. The ROM 11c statically stores the program to be executed by the CPU 11a, data, and the like. The ROM 11c is an example of a non-transitory computer readable recording medium.

The control circuit 100 is connected to an image reading unit 12 (image scanner), an image processing unit 14 (including a graphics processing unit (GPU)), an image memory 15, an image forming unit 16 (printer), an operation unit 17 (touch panel) including a display unit 17a, a large-capacity non-volatile storage device 18 such as a hard disk drive (HDD) and a solid state drive (SSD), a facsimile communication unit 19, a network communication interface 13, and the like. The control circuit 100 performs operation control of the respective units connected thereto and transmits receives signals or data to/from the respective units. The operation unit 17 (touch panel) is an embodiment of an input device. As the input device, a voice input device including a microphone may be provided.

3. Hardware Configuration of Management Server

Figure 4:
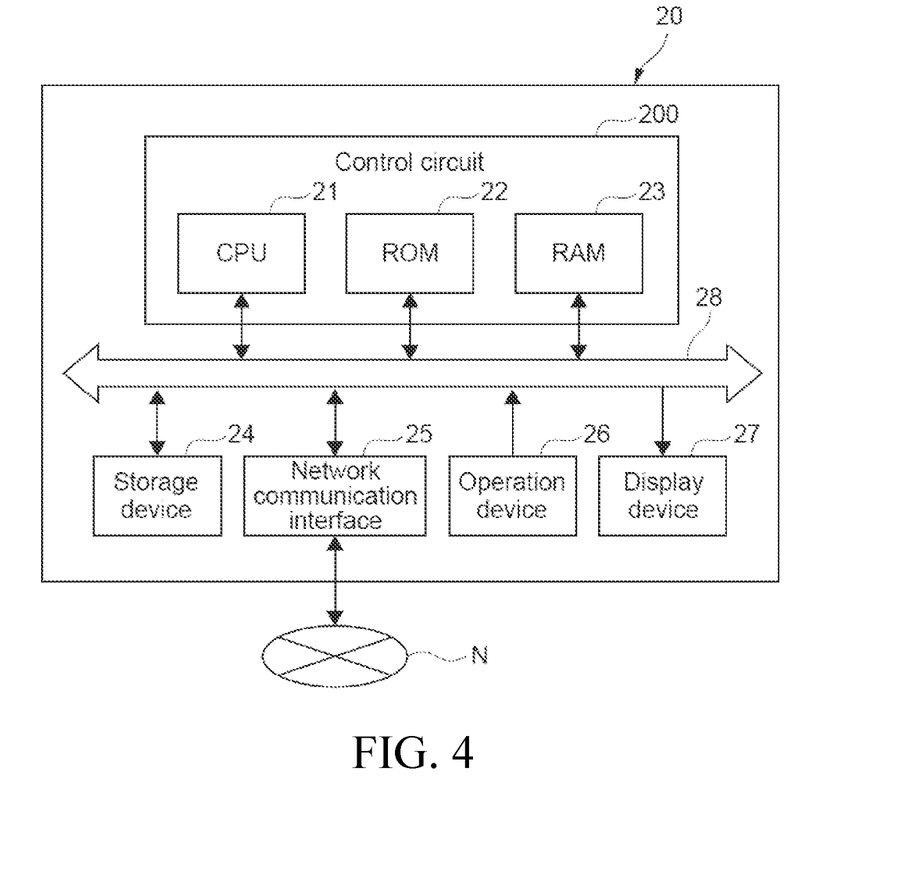
FIG. 4 shows a hardware configuration of a management server.

FIG. 4 shows a hardware configuration of a management server.

The print management server 20 includes a CPU 21, a ROM 22, a RAM 23, a large-capacity non-volatile storage device 24 such as an HDD and an SSD, a network communication interface 25, an operation device 26, a display device 27, and a bus 28 that connects them to each other. A partial area of the storage device 24 functions as the management server cloud storage 29. The management server cloud storage 29 logically only needs to belong to the print management server 20, may be built in the print management server 20, and/or may be physically independent and connected.

The CPU 21, the ROM 22, and the RAM 23 constitute a control circuit 200. The CPU 21 loads the information processing program stored in the ROM 22 into the RAM 23 and executes the program. The ROM 22 statically stores the program to be executed by the CPU 21, data, and the like. The ROM 22 is an example of a non-transitory computer readable recording medium.

4. Functional Configuration of Information Processing System

Figure 5:
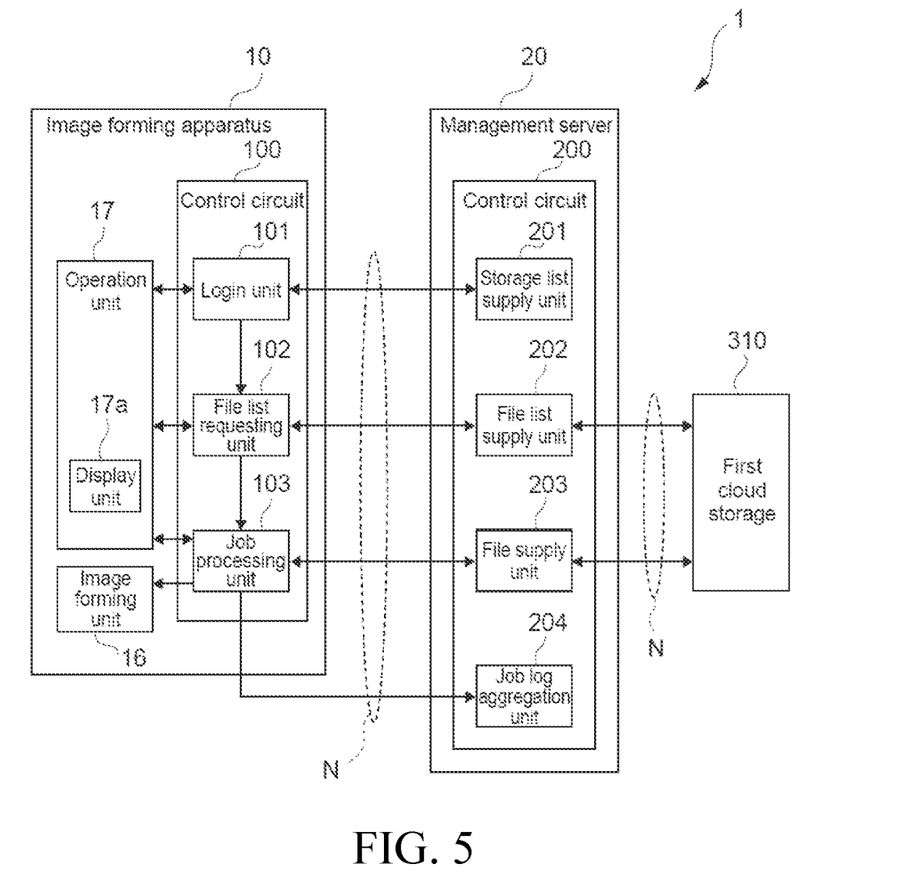
FIG. 5 shows a functional configuration of the information processing system.

FIG. 5 shows a functional configuration of the information processing system.

In the control circuit 100 of the image forming apparatus 10, the CPU 11a loads the information processing program stored in the ROM 11c into the RAM 11b and executes the program, thereby operating as a login unit 101, a file list requesting unit 102, and a job processing unit 103.

In the control circuit 200 of the print management server 20, the CPU 21 loads the information processing program stored in the ROM 22 into the RAM 23 and executes the program, thereby operating as a storage list supply unit 201, a file list supply unit 202, a file supply unit 203, and a job log aggregation unit 204.

Figure 6:
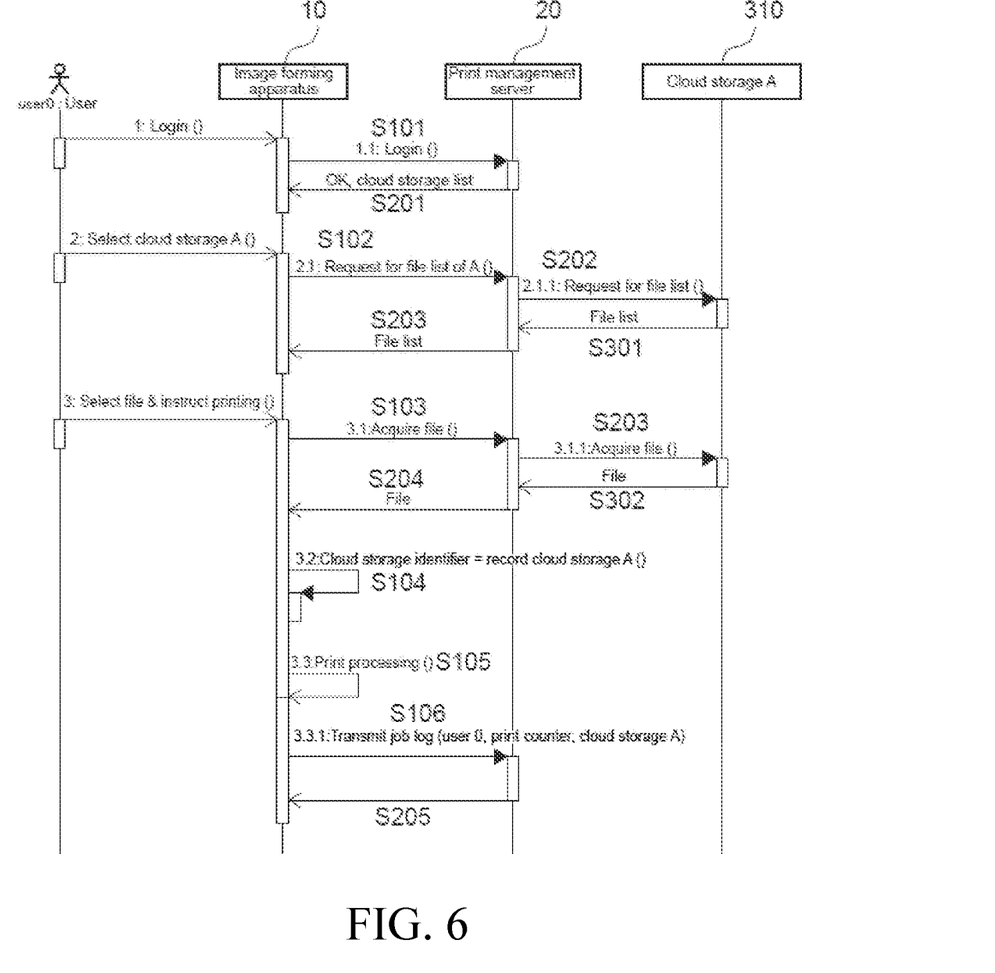
FIG. 6 shows an operation sequence of an information processing system according to a first embodiment.

5. Operation Sequence of Information Processing System According to First Embodiment FIG. 6 shows an operation sequence of an information processing system according to a first embodiment.

The login unit 101 of the image forming apparatus 10 receives a login operation of a user via the touch panel and transmits information relating to a user who logs in to the print management server 20 to the print management server 20 (Step S101).

The storage list supply unit 201 of the print management server 20 transmits, upon receiving the login of the user from the image forming apparatus 10, a login OK notification and a cloud storage list to the image forming apparatus 10, the cloud storage list indicating a plurality of pieces of cloud storage that the user can use (i.e., associated with the user) (Step S201). The plurality of pieces of cloud storage included in the cloud storage list include the management server cloud storage 29 and one piece or a plurality of (three in this example) pieces of third party cloud storage 30.

The login unit 101 of the image forming apparatus 10 receives the login OK notification and the cloud storage list from the print management server 20. The file list requesting unit 102 of the image forming apparatus 10 displays, on the touch panel, a GUI 110 for selecting one piece of cloud storage from the plurality of pieces of cloud storage (the management server cloud storage 29 and the third party cloud storage 30) included in the cloud storage list.

Figure 7:
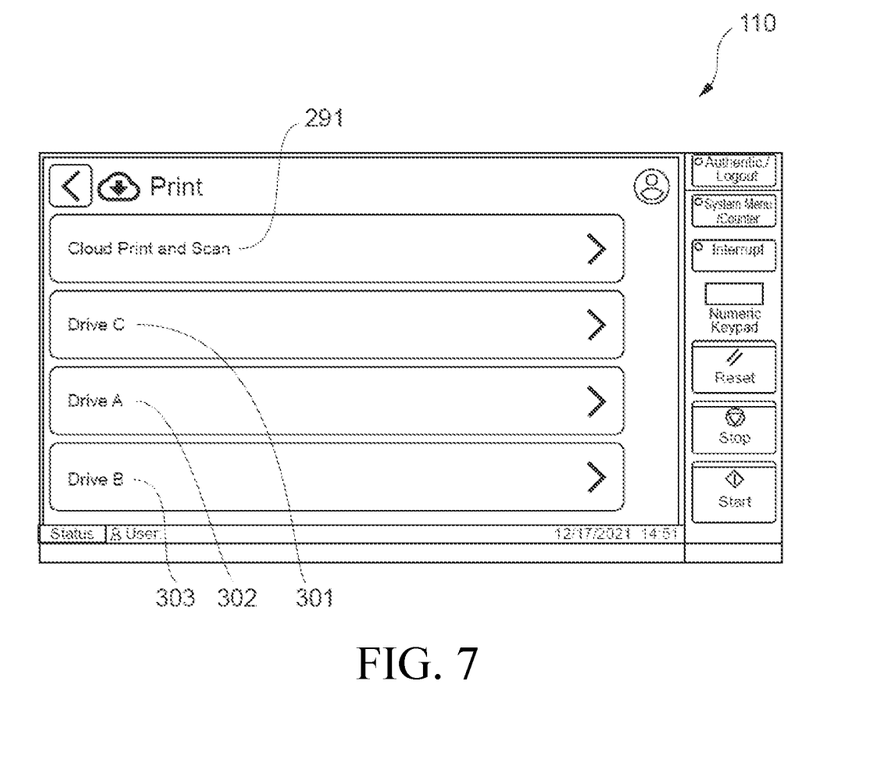
FIG. 7 shows an example of a GUI for selecting cloud storage.

FIG. 7 shows an example of a GUI for selecting cloud storage.

The GUI 110 includes a button 291 and buttons 301, 302, and 303 indicating the names of the plurality of pieces of cloud storage included in the cloud storage list received from the print management server 20, i.e., the name of the management server cloud storage 29 and the names of the plurality of (three in this example) pieces of third party cloud storage 30, respectively. The user operates one of the buttons 291, 301, 302, and 303 to select one piece of cloud storage (one of the management server cloud storage 29 and the pieces of third party cloud storage 30). Hereinafter, the cloud storage selected by the user will be referred to as first cloud storage 310.

The file list requesting unit 102 of the image forming apparatus 10 notifies the print management server 20 of the first cloud storage 310 selected from the cloud storage list by the user and requests for a file list indicating one or more files that the user can use, which are recorded on the first cloud storage 310 (Step S102).

The file list supply unit 202 of the print management server 20 requests, upon receiving the request from the image forming apparatus 10, the first cloud storage 310 for the file list indicating one or more files that the user can use, which are recorded on the first cloud storage 310 (Step S202).

The first cloud storage 310 transmits, upon receiving the request from the print management server 20, the file list indicating one or more files that the user can use, which are recorded on the first cloud storage 310, to the print management server 20 (Step S301).

The file list supply unit 202 of the print management server 20 receives, from the first cloud storage 310, the file list indicating one or more files that the user can use, which are recorded on the first cloud storage 310, and transmits the received filed list to the image forming apparatus 10 (Step S203).

The job processing unit 103 of the image forming apparatus 10 receives the file list from the print management server 20. The job processing unit 103 of the image forming apparatus 10 displays, on the touch panel, a GUI 120 for selecting one file from the plurality of filed included in the file list.

Figure 8:
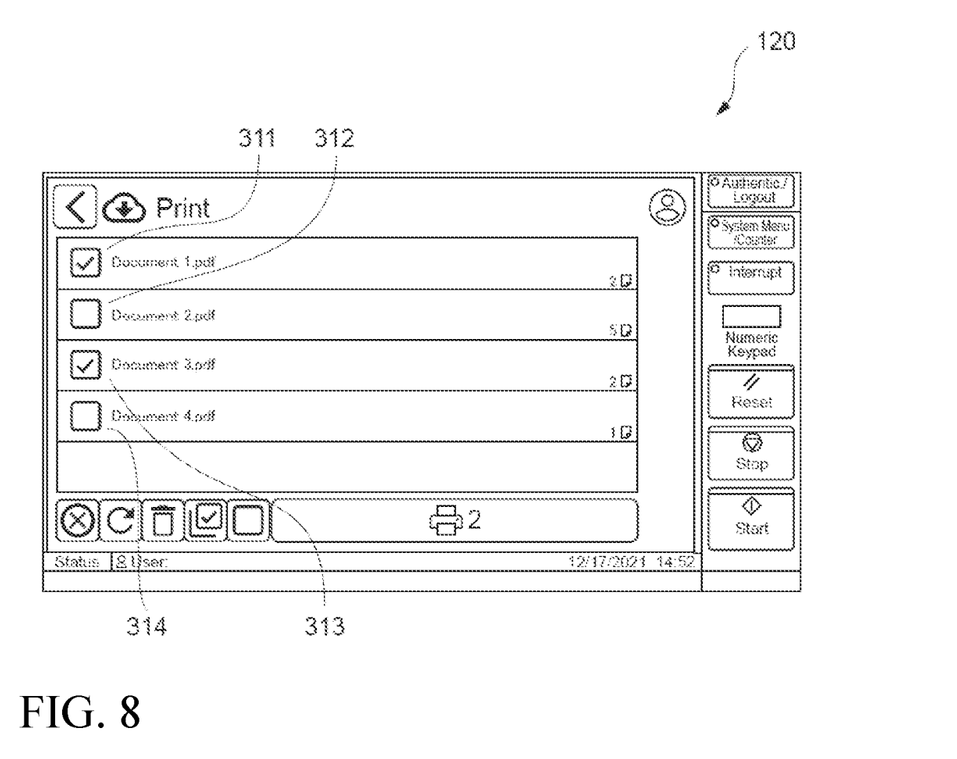
FIG. 8 shows an example of a GUI for selecting a file.

FIG. 8 shows an example of a GUI for selecting a file.

The GUI 120 includes buttons 311, 312, 313, and 314 indicating the names of the plurality of files included in the file list received from the print management server 20. The user operates one of the buttons 311, 312, 313, and 314 to select one or a plurality of files. As shown in FIG. 8, the user may operate the buttons 311 and 313 to select two files. A case where the user has selected one file will be described below, and the file selected by the user will be referred to as a first file.

The job processing unit 103 of the image forming apparatus 10 notifies the print management server 20 of the first file selected from the file list of the first cloud storage 310 by the user and requests for the first file (Step S103).

The file supply unit 203 of the print management server 20 requests, upon receiving the request from the image forming apparatus 10, the first cloud storage 310 for the first file (Step S203).

The first cloud storage 310 transmits, upon receiving the request form the print management server 20, the first file to the print management server 20 (Step S302).

The file supply unit 203 of the print management server 20 receives the first file from the first cloud storage 310 and transmits the received first file to the image forming apparatus 10 (Step S204).

The job processing unit 103 of the image forming apparatus 10 receives the first file recorded on the first cloud storage 310 from the print management server 20. The job processing unit 103 records identification information of the first cloud storage 310 (Step S104).

The identification information of each piece of cloud storage (the management server cloud storage 29 and the third party cloud storage 30) is cloud storage identification information for uniquely identifying cloud storage, cloud storage attribute information for identifying the attribute of each piece of cloud storage, or a combination of the cloud storage identification information and the cloud storage attribute information. In FIG. 6, an example in which cloud storage identification information "cloud storage A" for uniquely identifying the first cloud storage 310 is recorded as the identification information of the first cloud storage 310 is shown.

The cloud storage attribute information indicates whether each piece of cloud storage is provided by a third party or the supplier of the print management server 20. For example, the cloud storage attribute information of the management server cloud storage 29 is the "company" and the cloud storage attribute information of the plurality of pieces of third party cloud storage 30 is the "third party". The image forming apparatus 10 only needs to hold a conversion table for converting the management server cloud storage 29 into one piece of cloud storage attribute information "company" and the plurality of pieces of third party cloud storage 30 into another piece of cloud storage attribute information "third party" in advance.

The job processing unit 103 of the image forming apparatus 10 executes a job using the first file (Step S105). The "job using the first file" is typically processing of printing the first file, but may be another type of job (e.g., facsimile transmission).

The job processing unit 103 of the image forming apparatus 10 transmits a job log to the print management server 20 (Step S106). The job log includes user identification information, a job counter value (print counter value in the case of the print job), and identification information ("cloud storage A" in this example) of the first cloud storage 310.

The job log aggregation unit 204 of the print management server 20 is configured to aggregate a job counter value for identification information of each piece of cloud storage. The job log aggregation unit 204 receives the job log from the image forming apparatus 10 and counts up the job counter value of the identification information included in the job log. In this example, the job log aggregation unit 204 counts up the job counter value of the identification information (in this example, the identification information "cloud storage A" of the first cloud storage 310) included in the job log. The job log aggregation unit 204 transmits, upon finishing the processing, ACK to the image forming apparatus 10 (Step S205).

Figure 9:
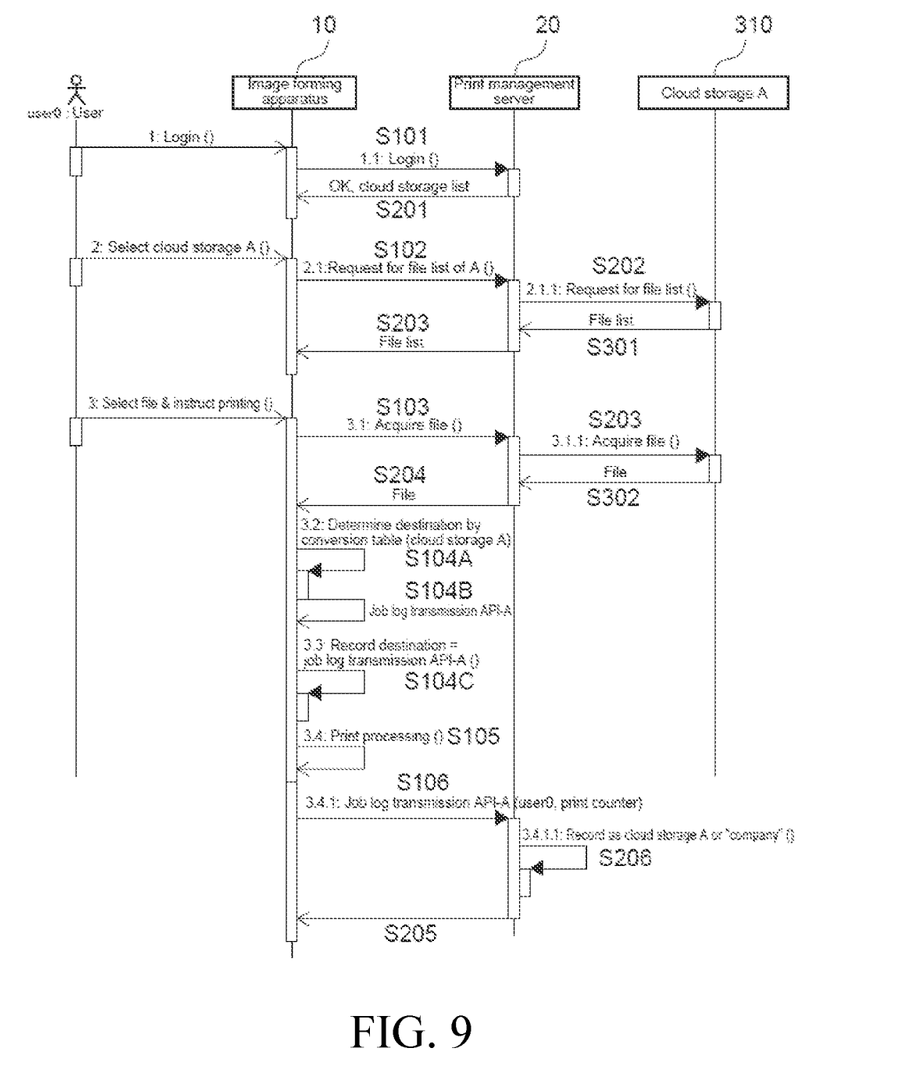
FIG. 9 shows an operation sequence of an information processing system according to a second embodiment.

6. Operation Sequence of Information Processing System According to Second Embodiment FIG. 9 shows an operation sequence of an information processing system according to a second embodiment.

The operations of Steps S101 to S103, Steps S201 to S204, and Steps S301 and S302 are similar to those in the first embodiment (FIG. 6).

The job processing unit 103 of the image forming apparatus 10 receives the first file recorded on the first cloud storage 310 from the print management server 20. The job processing unit 103 determines, as a destination of a job log, a first destination assigned to the first cloud storage 310 from the plurality of destinations set in the management server 20 (Step S104A). The destination differs for each piece of cloud storage or an attribute of each piece of cloud storage. The attribute distinguishes, for example, whether each piece of cloud storage is provided by a third party or the supplier of the print management server 20. The job processing unit 103 only needs to hold a conversion table for converting the first cloud storage 310 into the first destination in advance. The job processing unit 103 reads a job log transmission API-A that is an individual API for transmitting a job log to the first destination of the management server 20 (Step S104B). The job processing unit 103 records the job log transmission API-A as a destination for transmitting a job log to the first destination of the management server 20 (Step S104C).

The job processing unit 103 of the image forming apparatus 10 executes a job using the first file (Step S105). The "job using the first file" is typically processing of printing the first file, but may be another type of job (e.g., facsimile transmission).

The job processing unit 103 of the image forming apparatus 10 transmits a job log to the print management server 20 (Step S106). The job log includes at least user identification information and a job counter value (print counter value in the case of the print job). The job log does not necessarily need to include identification information ("cloud storage A" in this example) of the first cloud storage 310.

The job log aggregation unit 204 of the print management server 20 is configured to aggregate a job counter value for each destination. The job log aggregation unit 204 determines a destination that has received a job log from the image forming apparatus 10 and counts up the job counter value for each destination. In this example, the job log aggregation unit 204 counts up the job counter value included in the job log transmitted to the first destination in association with the identification information assigned to the first destination (Step S206). The job log aggregation unit 204 transmits, upon finishing the processing, ACK to the image forming apparatus 10 (Step S205).

The "identification information assigned to the destination" is cloud storage identification information for uniquely identifying cloud storage or cloud storage attribute information for identifying the attribute of each piece of cloud storage.

The cloud storage attribute information indicates whether each piece of cloud storage is provided by a third party or the supplier of the print management server 20. For example, the cloud storage attribute information of the management server cloud storage 29 is the "company" and the cloud storage attribute information of the plurality of pieces of third party cloud storage 30 is the "third party". The job log aggregation unit 204 of the print management server 20 only needs to hold a conversion table for converting one destination into one piece of cloud storage attribute information "company" and the plurality of destinations into another piece of cloud storage attribute information "third party" in advance.

In the case where the total number of the plurality of destinations is smaller (less) than the total number of the plurality of pieces of cloud storage 29 and 30, a common destination is assigned to some pieces of cloud storage 29 and 30 of the plurality of pieces of cloud storage 29 and 30. In this case, the job log may further include cloud storage 29 and 30 identification information for uniquely identifying the cloud storage 29 and 30. As a result, the combination of the destination and the cloud storage 29 and 30 identification information differs for each cloud storage 29 and 30. As a result, the job log aggregation unit 204 of the print management server 20 is capable of identifying the cloud storage 29 and 30, a job regarding the cloud storage 29 and 30 having been executed, although a common destination is assigned to some pieces of cloud storage 29 and 30 of the plurality of pieces of cloud storage 29 and 30. The job log aggregation unit 204 of the print management server 20 is capable of individually calculating appropriate charges in accordance with each piece of cloud storage 29 and 30 instead of a uniform charge, by aggregating a job counter value for each piece of cloud storage 29 and 30.

7. Conclusion

The job log aggregation unit 204 of the print management server 20 may determine, on the basis of job usage unit prices different depending on the identification information of each piece of cloud storage (the management server cloud storage 29 and the third party cloud storage 30), a charge for the job using each piece of cloud storage. For example, the job usage unit price for using a file recorded on the management server cloud storage 29 may be set higher than the job usage unit price for using a file recorded on the third party cloud storage 30.

As described above, the user of the image forming apparatus 10 typically pays the usage fee for the third party cloud storage 30 to the supplier of the third party cloud storage 30, but does not pay the usage fee for the management server cloud storage 29 to the supplier of the print management server 20. In this case, by setting the job usage unit price for using a file recorded on the management server cloud storage 29 higher than the job usage unit price for using a file recorded on the third party cloud storage 30, it is possible to cover expenses relating to file transmission from the management server cloud storage 29, and the like.

According to this embodiment, the job log aggregation unit 204 of the print management server 20 is capable of aggregating a job counter value (i.e., the job execution amount such as print volume) for each piece of cloud storage (the management server cloud storage 29 and the third party cloud storage 30) or for each attribute (company, third party) of the cloud storage. As a result, a user can generate a more detailed aggregation report. Further, a service provider can introduce more flexible fee structures, for example. For example, by setting the job usage unit price for using a file recorded on the third party cloud storage 30 higher than the job usage unit price for using a file recorded on the management server cloud storage 29 and aggregating a job counter value for each piece of cloud storage 29 and 30 or for each of the attributes thereof, it is possible to individually calculate appropriate charges in accordance with each piece of cloud storage 29 and 30 or each of the attributes thereof instead of a uniform charge.

Although embodiments of the present technology and modifications have been described above, the present technology is not limited to only the above-mentioned embodiments and it goes without saying that various modifications can be made without departing from the spirit of the present technology.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
an image forming apparatus; and
a management server that is communicably connected to the image forming apparatus via a network,
the image forming apparatus including a login unit, a file list requesting unit, and a job processing unit,
the management server including a storage list supply unit, a file list supply unit, a file supply unit, and a job log aggregation unit,
the login unit of the image forming apparatus transmitting information relating to a user who logs in to the management server to the management server,
the storage list supply unit of the management server transmitting a cloud storage list to the image forming apparatus, the cloud storage list indicating a plurality of pieces of cloud storage that the user can use, the plurality of pieces of cloud storage being communicably connected to the management server via the network,
the file list requesting unit of the image forming apparatus notifying the management server of first cloud storage selected from the cloud storage list by the user,
the file list supply unit of the management server transmitting a file list to the image forming apparatus, the file list indicating one or more files that the user can use, the one or more files being recorded on the first cloud storage,
the job processing unit of the image forming apparatus notifying the management server of a first file selected from the file list by the user,
the file supply unit of the management server acquiring the first file from the first cloud storage and transmitting the acquired first file to the image forming apparatus,
the job processing unit of the image forming apparatus executing a job using the first file and transmitting a job log including a job counter value and identification information of the first cloud storage to the management server,
the job log aggregation unit of the management server being configured to aggregate a job counter value for identification information of each piece of cloud storage and counting up the job counter value included in the job log.

2. The information processing system according to claim 1, wherein the identification information of each piece of cloud storage is one of
cloud storage identification information for uniquely identifying each piece of cloud storage,
cloud storage attribute information for identifying an attribute of each piece of cloud storage, and
a combination of the cloud storage identification information and the cloud storage attribute information.

3. The information processing system according to claim 2, wherein the cloud storage attribute information indicates whether each piece of cloud storage is provided by a third party or a supplier of the management server.

4. The information processing system according to claim 1, wherein the plurality of pieces of cloud storage included in the cloud storage list includes management server cloud storage provided by a supplier of the management server, and third party cloud storage provided by a supplier different from the supplier of the management server.

5. The information processing system according to claim 4, wherein a job usage unit price for using a file recorded on the management server cloud storage is set higher than a job usage unit price for using a file recorded on the third party cloud storage.

6. The information processing system according to claim 1, wherein the job log aggregation unit of the management server determines, on a basis of job usage unit prices different depending on the identification information of each piece of cloud storage, a charge for a job using each piece of cloud storage.

7. An information processing system, comprising:
an image forming apparatus; and
a management server that is communicably connected to the image forming apparatus via a network,
the image forming apparatus including a login unit, a file list requesting unit, and a job processing unit,
the management server including a storage list supply unit, a file list supply unit, a file supply unit, and a job log aggregation unit,
the login unit of the image forming apparatus transmitting information relating to a user who logs in to the management server to the management server,
the storage list supply unit of the management server transmitting a cloud storage list to the image forming apparatus, the cloud storage list indicating a plurality of pieces of cloud storage that the user can use, the plurality of pieces of cloud storage being communicably connected to the management server via the network,
the file list requesting unit of the image forming apparatus notifying the management server of first cloud storage selected from the cloud storage list by the user,
the file list supply unit of the management server transmitting a file list to the image forming apparatus, the file list indicating one or more files that the user can use, the one or more files being recorded on the first cloud storage,
the job processing unit of the image forming apparatus notifying the management server of a first file selected from the file list by the user,
the file supply unit of the management server acquiring the first file from the first cloud storage and transmitting the acquired first file to the image forming apparatus,
the job processing unit of the image forming apparatus determining, as a destination of a job log, a first destination assigned to the first cloud storage from a plurality of destinations set in the management server, executing a job using the first file, and transmitting a job log including a job counter value to the first destination of the management server,
the job log aggregation unit of the management server being configured to aggregate a job counter value for each destination and counting up the job counter value of the job log transmitted to the first destination.

8. The information processing system according to claim 7, wherein the destination differs for one of each piece of cloud storage and an attribute of each piece of cloud storage.

9. The information processing system according to claim 8, wherein the plurality of destinations distinguishes whether each piece of cloud storage is provided by a third party or the supplier of the management server.

10. The information processing system according to claim 7, wherein the plurality of pieces of cloud storage included in the cloud storage list includes
    management server cloud storage provided by a supplier of the management server, and
    third party cloud storage provided by a supplier different from the supplier of the management server.

11. The information processing system according to claim 10, wherein a job usage unit price for using a file recorded on the management server cloud storage is set higher than a job usage unit price for using a file recorded on the third party cloud storage.

12. The information processing system according to claim 7, wherein the job log aggregation unit of the management server determines, on a basis of job usage unit prices different depending on the destination, a charge for a job using each piece of cloud storage.

13. The information processing system according to claim 7, wherein
    a total number of the plurality of destinations is smaller than a total number of the plurality of pieces of cloud storage,
    a common destination is assigned to some pieces of cloud storage of the plurality of pieces of cloud storage,
    the job log further includes cloud storage identification information for uniquely identifying each piece of cloud storage, and
    a combination of the destination and the cloud storage identification information differs for each piece of cloud storage.

* * * * *